US006907630B2

(12) United States Patent
Treon

(10) Patent No.: US 6,907,630 B2
(45) Date of Patent: Jun. 21, 2005

(54) LOAD COMPENSATION SYSTEM FOR POWER CHAIR

(75) Inventor: Thomas L. Treon, Versailles, OH (US)

(73) Assignee: Midmark Corporation, Versailles, OH (US)

( * ) Notice: Subject to any disclaimer, the term of this patent is extended or adjusted under 35 U.S.C. 154(b) by 0 days.

(21) Appl. No.: 10/684,050

(22) Filed: Oct. 10, 2003

(65) Prior Publication Data

US 2005/0077861 A1 Apr. 14, 2005

(51) Int. Cl.[7] ........................... G05B 11/01; A47C 1/14
(52) U.S. Cl. ........................... 5/611; 318/433; 318/265; 318/286
(58) Field of Search ........................... 318/256, 257, 318/264–268, 272, 286, 430–434; 5/600, 611, 616

(56) References Cited

U.S. PATENT DOCUMENTS

| | | | | |
|---|---|---|---|---|
| 3,656,478 A | | 4/1972 | Swersey | |
| 3,896,704 A | | 7/1975 | Barud et al. | |
| 4,101,120 A | | 7/1978 | Seshima | |
| 4,227,131 A | * | 10/1980 | Thiene | 318/467 |
| 4,794,655 A | | 1/1989 | Ooka et al. | |
| 4,907,571 A | * | 3/1990 | Futakami | 601/23 |
| 4,953,244 A | * | 9/1990 | Koerber et al. | 5/600 |
| 4,956,592 A | | 9/1990 | Schulte et al. | |
| 5,163,189 A | | 11/1992 | DeGray | |
| 5,696,686 A | | 12/1997 | Sanka et al. | |
| 5,715,548 A | | 2/1998 | Weismiller et al. | |
| 5,771,511 A | | 6/1998 | Kummer et al. | |
| 5,856,736 A | | 1/1999 | Rotunda et al. | |
| 5,887,302 A | * | 3/1999 | DiMucci et al. | 5/611 |
| 5,990,639 A | | 11/1999 | Arai et al. | |
| 6,000,077 A | | 12/1999 | Cyr | |
| 6,163,903 A | | 12/2000 | Weismiller et al. | |
| 6,316,895 B1 | | 11/2001 | Ramarathnam | |
| 6,336,235 B1 | | 1/2002 | Ruehl | |
| 6,469,263 B1 | * | 10/2002 | Johnson | 177/144 |
| 6,517,775 B1 | | 2/2003 | Wang et al. | |
| 2002/0085950 A1 | | 7/2002 | Robitaille et al. | |

OTHER PUBLICATIONS

MIDMARK, *Installation and Operation Manual 712 Power Plastic Surgery Table*, (1995).

* cited by examiner

*Primary Examiner*—Bentsu Ro
(74) *Attorney, Agent, or Firm*—Wood, Herron & Evans, L.L.P.

(57) ABSTRACT

An apparatus and method positions a powered examination chair at a constant, desired speed. The desired speed is achieved irrespective of patient weight and/or direction of chair travel. A power signal supplied to an actuating motor is apportioned according to a load incident on the chair. The determined load accounts for patient weight, as well as to gravitational and mechanical forces.

33 Claims, 4 Drawing Sheets

LOAD COMPENSATION SYSTEM FOR POWER CHAIR

CROSS-REFERENCE TO RELATED APPLICATION

This application is related to concurrently filed U.S. Patent Applications entitled "Line Voltage Compensation System for Power Chair" and "Smooth Start System for Power Chair." The entire disclosures of these U.S. patent applications are incorporated into this application by reference.

FIELD OF THE INVENTION

The present invention relates to powered chairs and tables, and more particularly, to examination chairs and tables that may be automatically elevated, lowered or tilted.

BACKGROUND OF THE INVENTION

Patient comfort and practitioner efficiency remain paramount considerations within the healthcare industry. To this end, powered examination chairs featuring automatically moveable back, foot or other support surfaces have developed to facilitate clinical applications. Many such chairs may be positioned at a predetermined height above the floor. Support surfaces of the chair can often be manipulated to adjust the position of the person seated within, and many chairs can be lowered or raised in order to reduce the distance between a seated patient and the floor or healthcare professional.

An examination chair typically includes adjustable side rails positioned to restrain the movement of the patient seated in the chair. The side rails of the chair may e manually or automatically moved to a position away from the seat of the chair to facilitate the person getting in and out of the chair.

The speed at which a chair is designed to move is conventionally set at a nominal, or target speed. This target speed generally consists of a range of expected speeds, and is ideally optimized for efficient and predictable chair movement. As such, a voltage is supplied to a motor to produce a speed that generally falls within the target range. More particularly, the supplied voltage theoretically induces an amount of revolutions per minute in the motor that will cause the chair to generally move at the target speed.

However, the speed that conventional chairs actually move can vary dramatically from this target range. This inconsistency is often attributable to the weight of the patient or other some other load acting on the chair. The load incident on the chair causes the number of revolutions per minute to vary. The speed at which the chair moves reflects this variance. Namely, the load placed on the motor causes voltage to be diverted from its intended purpose of generating revolutions per minute.

Some conventional target speeds factor in the affect of an estimated load when determining the voltage or magnetic force level. Notably, this estimated load is a static figure. That is, the voltage is set according to a single, standard or median load. In this manner, voltage supplied to the motor of a conventional chair is set at a level that will generally achieve the target speed for a patient whom is precisely the standard weight.

The weight of patients, however, can vary dramatically from the standard weight estimate to which the motor is geared and powered. As the power level is set exclusively to the standard load, deviation from that standard load translates into the motor moving the chair at a rate that deviates from the target speed. That is, the chair moves at a faster or slower rate than the target speed. This variance and unpredictability poses an inconvenience and distraction to healthcare professionals and patients, alike.

Speed variance may also be encountered or exacerbated in circumstances where a chair is lowered or raised. Gravitational forces acting in concert with the patient and chair weight cause the motor to have to work relatively harder in order to raise the patient. Consequently, the speed of the chair is slower than the target speed when being raised. Conversely, the motor works less when lowering the chair. The speed of the chair is thus faster than the target speed when the chair is lowered.

As a consequence, what is needed is an improved manner of automatically adjusting the position of a power chair that mitigates the affect of load forces on chair/motor speed.

SUMMARY OF THE INVENTION

The present invention provides an improved method and apparatus for automatically positioning a powered chair that addresses the above shortcomings of the prior art. In one sense, an embodiment of the present invention positions a chair at a desired speed irrespective of load forces acting on the chair. An exemplary load force may include the weight of a patient, as well as other gravitational and mechanical forces associated with chair travel. The desired speed is achieved by apportioning voltage to the motor according to the load. For example, a constant motor speed may be achieved by compensating for patient weight and chair travel direction.

More particularly, a load signal indicative of the load on the chair is used to determine a voltage, or magnetic force, that should be included in a power signal. That power signal is applied to a motor to produce a desired speed. Such determination processes as are consistent with the principles of the present invention may include determining the voltage applied to and/or the current drawn by the motor. Namely, a voltage associated with the current draw of the motor is subtracted from the voltage signal supplied to the motor. Because the resultant applied voltage is proportional to the current. drawn by the motor from the voltage supplied to the motor, the applied voltage is proportional to or otherwise indicative of the speed of the motor.

This determined, or applied voltage may them be compared to a reference voltage. The reference voltage is typically associated with a desired speed. The desired speed may relate to either or both the motor speed and the speed at which the chair moves. The duty cycle of a power signal supplied to the motor is modified according to the voltage comparison. Where advantageous, voltage and/or other load determinations may be correlated to power levels stored within a memory.

Another of the same embodiment that is consistent with the principles of the present invention may receive a load signal indicative of a direction in which movement of the support apparatus is desired. This input signal may be correlated to a power level and/or stored reference voltage. The determined power level may be used to generate a power signal that drives the motor. In this manner, a constant speed may be achieved irrespective of the load forces associated with the direction in which the chair moves.

By virtue of the foregoing there is provided an improved chair positioning system that addresses shortcomings of the prior art. These and other objects and advantages of the present invention shall be made apparent in the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention.

DETAILED DESCRIPTION OF THE PREFERRED EMBODIMENTS

Figure 1:
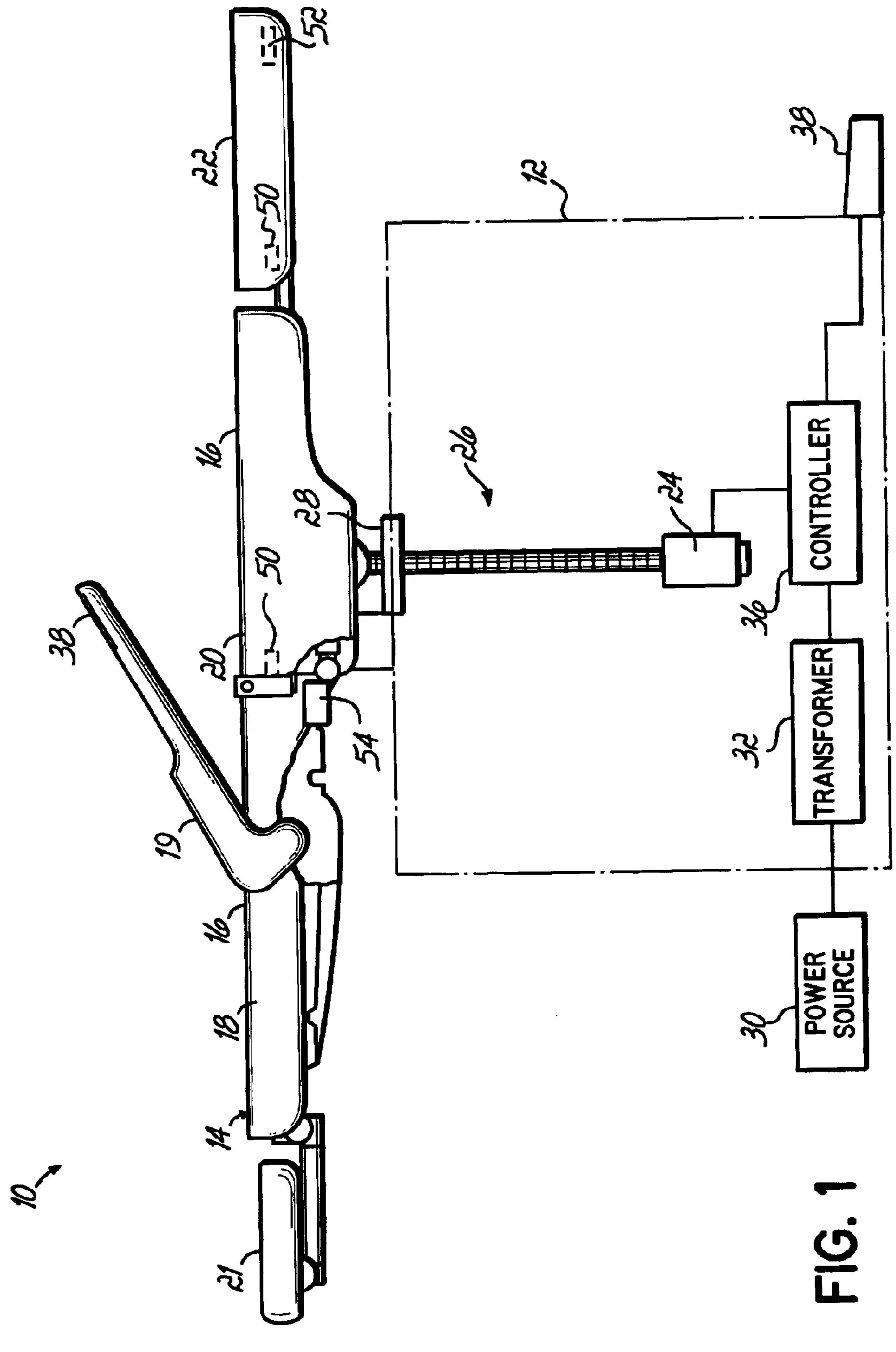
FIG. 1 shows a schematic diagram of a chair system in accordance with the principles of the present invention.

FIG. 1 shows chair system 10 that may be positioned at a desired speed in accordance with the principles of the present invention. The chair system 10 includes a moveable column 12 to which a support surface 14 is mounted. Upholstered sections 16 are removable and mounted to the support surface 14. As shown in FIG. 1, the support surface 14 comprises a back support 18 and a head support 21 that pivotally attach to a seat support 20. The support surface 14 additionally includes a foot support 22, which also pivotally attaches to the seat support 20. The chair system 10 illustrated in FIG. 1 is equipped with powered tilt and elevation and may be positioned according to a number of settings.

The block diagram of FIG. 1 shows a motor 24 configured to power an actuator 26. A motor 24 comprises a direct current (DC) motor. One skilled in the art, however, will appreciate that any manner of electric motor, including alternating current (AC) motors, may be alternatively used in accordance with the principles of the present invention.

An actuator 26 consistent with the principles of the present invention includes any device configured to initiate movement of the support surface 14. The actuator 26 may include a screw shaft and gearing for enabling the motor to rotate the screw shaft. For this purpose, a nut may be mounted on each shaft for converting the rotary motion of the shaft into linear motion of an actuator arm 28. The actuator arm 28, in turn, positions the support surface 14. While only one motor 24 and actuator 26 are shown in FIG. 1, one skilled in the art will appreciate that several such motors and/or actuators may be used to position a chair system 10 in accordance with the principles of the present invention.

A source 30 supplies voltage to a transformer 32, which powers the chair system 10 of FIG. 1. An exemplary transformer 32 steps down voltage from the power source 30 for hardware convenience and operating considerations. A suitable source 30 may include DC or AC input voltage.

More particularly, the motor 24 of the chair system 10 receives power from motor control circuitry 34 of a controller 36. The motor control circuitry 34 produces a power signal having a fixed frequency and adjustable pulse width. As such, the controller 36 of the embodiment shown in FIG. 1 generates pulse width modulated (power) signals including a variable duty cycle. The power signal delivers a variable voltage. to the motor 24. Using this pulse width modulated scheme, the motor speed is held constant despite changes in motor load. For purposes of this specification, motor "speed" may alternatively be referred to as "revolutions per minute;"

The controller 36, in turn, may receive external control inputs from a series of switches, pedals and/or sensors comprising user input devices 38. Such input may comprise a load signal in an embodiment of the present invention. Other load signal sources may include output from voltage and load sensing circuitry (included within the controller 36, as shown in the embodiment of FIG. 1). As discussed herein, a load signal is associated, derived from, suggestive or otherwise indicative of load forces incident on the chair system 10. Moreover, the term "load" for purposes of this specification may include: a patient weight, voltage, current, speed signal (such as generated using a tachometer), force or other measurement relating to energy, power, voltage or magnetic force required by a motor 24 in moving a support surface 14.

Where desirable, the chair system 10 may include position sensors 50 and limit switches 52 for detecting and limiting the positions and movement of the support surface 14. One embodiment consistent with the principles of the present invention includes a weight sensor 54. An exemplary weight sensor 54 is configured to determine at least a portion of a load comprising the weight of a patient seated in the chair system 10. The weight sensor 54 may comprise an alternative or additional source of input used to generate a load signal.

Figure 2:
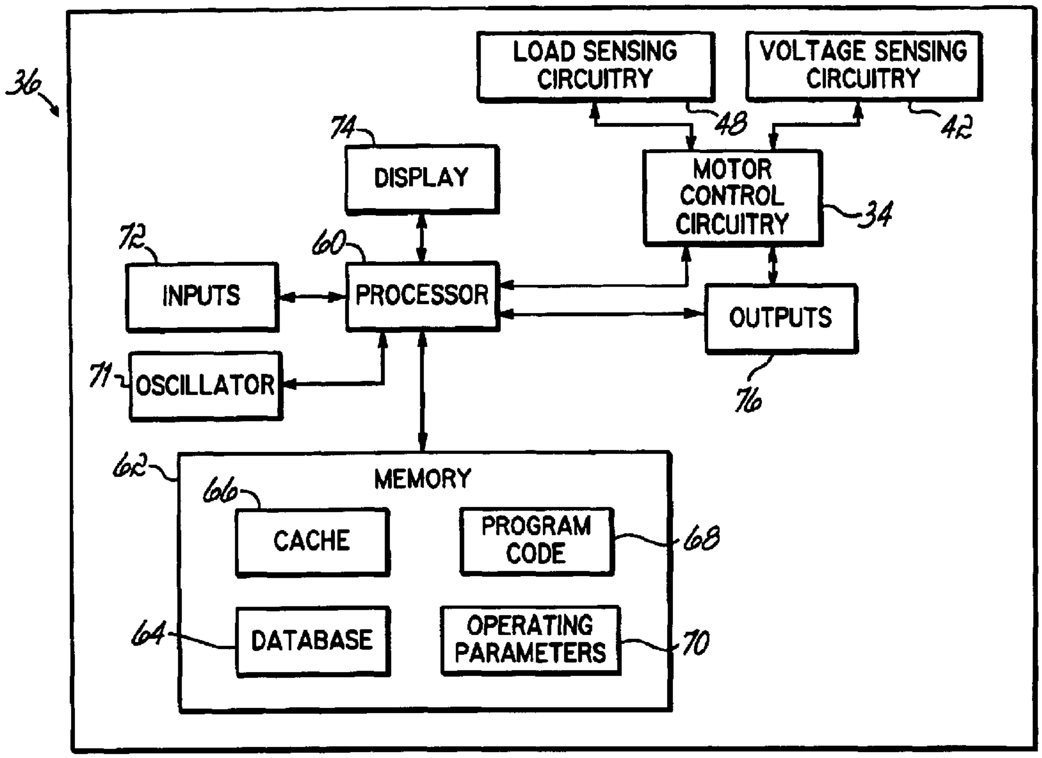
FIG. 2 shows a block diagram of the controller of FIG. 1.

FIG. 2 is a block diagram of the controller 36 of FIG. 1. As shown in FIG. 2, the controller 36 may include one or more processors 60. The controller 36 may additionally include a memory 62 accessible to the processor 60. The memory 62 may include a database 64 and/or cache memory 66. For instance, a database may contain lookup values for correlating a sensed load or voltage to a direction and/or power level. Another exemplary database may include a lookup feature for correlating a voltage magnitude to a signal profile. For example, a voltage magnitude may be correlated to a duty cycle parameter. Cache memory 66 may be used to temporarily store a sensed voltage or current, for instance.

The memory 62 may also include program code 68. Such program code 68 is used to operate the chair system 10 and is typically stored in nonvolatile memory, along with other data the system 10 routinely relies upon. Such data may also includes operating parameters 70 such as predefined reference voltages, crash avoidance and program addresses. Program code 68 typically comprises one or more instructions that are resident at various times in memory 62, and that, when read and executed by the processor 60, cause the controller 36 to perform the steps necessary to execute functions or elements embodying the various aspects of the invention.

The controller 36 also receives and outputs data via various input devices 72, a display 74 and an output device 76. A network connection may comprise another input device 72 that is consistent with the principles of the present invention. Exemplary input device 72 may include hand and foot pedals 38, as well as input from a voltage detection circuit 40 and/or a voltage sensor 54. A suitable display 74 may be machine and/or user readable. Exemplary output(s)

76 may include a port and/or a network connection. As such, the controller 36 of an embodiment that is consistent with the principles of the present invention may communicate with and access remote processors and memory, along with other remote resources.

The controller 36 of FIG. 2 includes motor voltage sensing circuitry 42 that comprises a device configured to measure voltage applied to and/or the rotational speed of the motor 24. The controller 36 further includes motor load sensing circuitry 48. The motor load sensing circuitry 48 comprises a device that measures current through and/or the rotational speed of the motor 24. While the controller 36 of FIG. 2 includes voltage sensing circuitry 42 and load sensing circuitry 48, one skilled in the art will appreciate that other embodiments that are consistent with the invention may alternatively include voltage and load sensing circuitry equivalents external to the controller. Moreover, one of skill in the art will appreciate that the functionality of the voltage sensing circuitry 42 and load sensing circuitry 48, as with all functionality of the controller 36 and electrical components of the chair system 10, may alternatively be realized in an exclusively or hybrid software environment. Furthermore, a controller for purposes of this specification may include any device comprising a processor.

The processor 60 optically or otherwise interfaces with and provides instructions to the motor control circuitry 34. The motor control circuitry 34 receives input from the motor load sensing circuit 48 and the motor voltage sensing circuitry 42 to determine an applied voltage signal that is directly proportional to the actual speed of the motor 24. The motor control circuitry 34 further compares the applied voltage signal to a stored reference voltage. If they do not match within predefined parameters, the controller 36 may generate an error signal. The motor control circuitry 34 processes the error signal to determine how to modulate the pulse width (and duty cycle) of the power signal.

Figure 3:
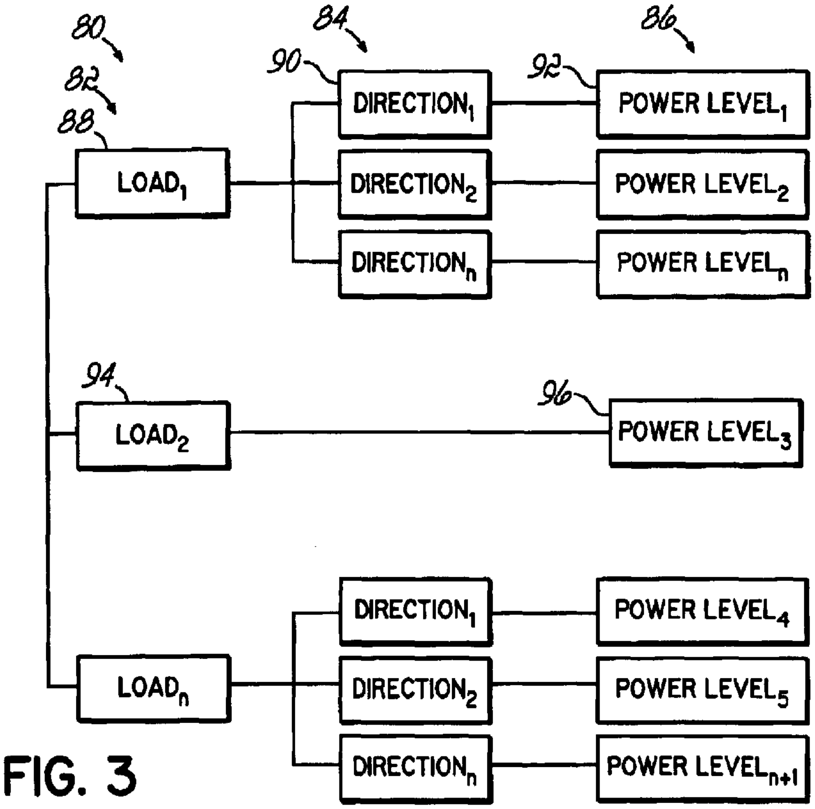
FIG. 3 shows a database schematic having application within the controller of FIG. 2.

FIG. 3 is a database schematic 80 having application within the memory 62 of FIG. 2. The exemplary schematic 80 includes a column 82 of load fields that are logically linked to either or both: a field comprising a direction in column 84 and a power level field, as shown in column 86. As such, the database schematic 80 provides differing power levels 86 with respect to differing load values 82 to achieve a desired speed.

Additionally, because the direction of chair movement can affect speed, the database schematic 80 includes different power levels 86 for the same load value 88, depending on the specified direction 84. Typically, a power level correlated to a load being raised in a chair 10 will be larger than a power level correlated to the same load and a downward direction. As discussed herein, the difference may be attributable to gravitational forces and/or a mechanical advantage associated with gearing. Similarly, a power level logically associated with a heavier load will be higher than a power level associated with a lighter load.

An exemplary load value in field 88 may comprise the weight of a patient and/or the support surface 14. The load 88 may also include a sensed voltage value. For example, the load 88 may include a voltage level sensed in connection with the operation of the motor 24, including the voltage supplied to the motor 24. The load value 88 may also include forces indicative of some mechanical advantage, such as those attributable to gearing or some other support structure. For instance, it may require more work to move a support surface 14 from its lowest position than when the support surface 14 is at a relatively higher, intermediate position.

One skilled in the art will appreciate that the load value 88 may be particular to a specific support surface 14. For instance, the load value 88 may be associated with one or more of: a back support 18, a seat support 20, an armature 19, or any other moveable component of the chair system 10. A typical direction field 90 comprises "up" or "down." However, one of skill in the art may appreciate that other directions having a horizontal vector component may be included where appropriate and as dictated by the nature of the support surface 14 being moved.

The load 88 and input direction 90 may be logically linked, or correlated, to a power level field 92. The power level contained in the field 92 may comprise a voltage and/or signal protocol associated with a desired speed. For instance, such a signal protocol may include a duty cycle. The signal protocol may be used to generate a power signal at the controller 36. The power level may further comprise a stored reference voltage.

As such, a load value 88 indicative of a patient's weight may be processed in conjunction with a desired direction 90 to determine a power level 92 that is required to maintain a desired speed. Thus, the controller 36 determines a power level 92 that will compensate for variance in loads and/or directions in a manner that addresses the problems of the prior art.

The fields of the database 80 may be populated using clinically established and/or independently computed data. Moreover, while the database schematic of FIG. 3 may have particular application within certain embodiments of the present invention, one skilled in the art will recognize that the controller 36 may alternatively determine a power level by processing directional and load value inputs without using a database 80. For example, input load and/or directional data may be multiplied by or otherwise processed using scaled factors to arrive at a comparable or identical power level.

As shown in FIG. 3, an embodiment of the present invention enables different desired speeds for a support surface 14 to be set according to respective, different directions. For instance, a doctor may prefer that the desired speed at which a given a support surface 14 lowers be slower than a second desired speed at which the support surface elevates. Moreover, different desired speeds may be set for different support surfaces. For instance, a foot support 22 may be programmed to move at a higher speed than a back support 18.

When used in conjunction with position sensors 50 or another location determining device or process, different desired speeds may apply to different portions of a chair's travel. For example, the final ten inches of a chair's descent may be executed at a slower desired speed than the prior two feet of descent. Thus, features of the present invention allow maximum flexibility in designing and setting desired speed (s). To this end, a user in the factory or field may customize speeds via an input device 38.

In an embodiment where no directional data is available or needed, a load level 94 may be directly correlated to a respective power level 96. Similarly, a load level may alternatively be correlated directly to a direction field, where applicable. In any case, one skilled in the art will appreciate a number of alternative logical associations that may be realized in a computer context in accordance with the underlying principles of the present invention.

Figure 4:
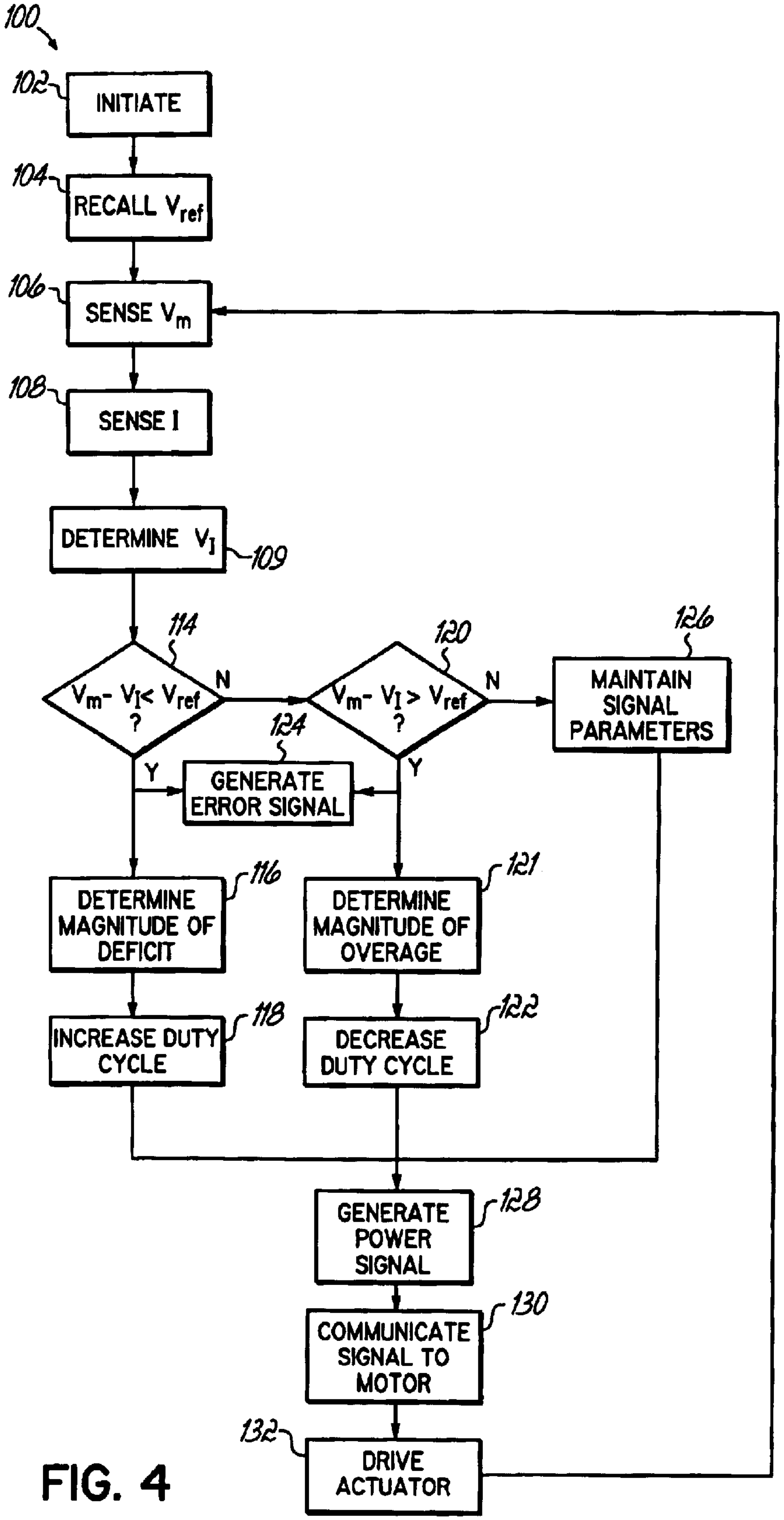
FIG. 4 is a flowchart having a sequence of steps executable by the system of FIG. 1 for automatically positioning a chair at a desired speed using a determined voltage measurement.

FIG. 4 is a flowchart 100 having a sequence of steps configured to move a support surface 14 at a constant, desired speed. Turning more particularly to the flowchart 100, a user may initiate processes that are consistent with the present invention at block 102. Such processes may include booting relevant program code 68, as well as receiving user/automated inputs 72, such as commands to move a support surface 14. Other processes performed at block 102 may include initializing applicable memory 62. For example, initialization processes may prompt the recall from memory 62 of a reference voltage, $V_{ref}$, as shown in block 104. The reference voltage is typically preset during manufacturing. However, the reference voltage may be programmatically modified, where desired. In either case, an exemplary reference voltage is typically set in proportion to a desired speed.

More particularly, voltage applied across the motor 24 is roughly proportional to the revolutions per minute (rpm's) of the motor 24. The rpm's, in turn, are translatable into a distance traveled by a support surface 14 in a determinable period of time. Thus, the reference voltage can be set at a magnitude that generally or precisely corresponds to a desired speed.

An embodiment consistent with the principles of the present invention may use a stepped-down or derivative voltage level as the reference voltage. For instance, a voltage of 48 volts delivered to the motor 24 may correspond to a reference voltage of 5 volts. This stepped-down voltage may have signal processing advantages.

The reference voltage is used as a point of comparison for the actual, or applied voltage delivered to the motor 24. One skilled in the art will appreciate that an embodiment that is consistent with the principles of the present invention may include a device that directly senses voltage delivered to or from the motor 24. Alternatively, the processes associated with sensing the motor voltage and current draw may be supplanted or augmented with sensor or user input indicative of a patient's weight or other load data. As such, the above processes of blocks 106 and 108 represent just one manner of determining actual voltage or load in accordance with the principles of the present invention.

As a first step towards determining the actual voltage delivered to the motor 24, the voltage sensing circuitry 42 may measure at block 106 a motor voltage, $V_m$, delivered to the motor. As discussed herein, the measured motor voltage may be stepped down to accommodate circuitry specifications. In any case, a portion of the motor voltage delivered to the motor 24 is lost or consumed by the motor 24 during operation. At least a portion of such loss in motor voltage is attributable to load. That is, the motor 24 must draw additional current. This increased current draw reduces rpm production in order to accommodate load forces communicated to the motor 24 via the actuator 26. As such, the amount of current or voltage needed to manage the load forces can be used to determine the percentage of voltage provided to the motor 24 that actually goes towards producing rpm's and, ultimately, speed.

To determine these losses in one embodiment that is consistent with the principles of the present invention, a current sensor 44 measures the current, I, drawn by the motor 24. The drawn current flows in response and in proportion to the voltage levels applied to the motor 24 and caused by the loading of the actuator 26. Because the resistive characteristics of the motor 24 and load sensing circuitry 48 are known, a voltage attributable to the load, $V_l$, can be determined using Ohm's Law. Namely, the voltage loss is determined according to: $V_l I \times R_{(motor\ and\ load\ sensing\ circuitry)}$.

The actual, or applied voltage used for motor speed may then be determined by subtracting the load voltage from the motor voltage. This step is included in the comparison of the applied voltage to the referenced voltage at block 114 of FIG. 4.

Though not shown in FIG. 4, the determined motor voltage, load current and load voltage may be stored and communicated to the controller 36, where appropriate. Similarly, an embodiment that is consistent with the principles of the present invention may likewise store the applied voltage for future reference or other use.

As shown at block 114, the comparison of the applied voltage ($V_m - V_l$) to the voltage reference ($V_{ref}$) may determine if the duty cycle of a power signal delivered to the motor 24 should be modified. For example, where the applied voltage is less than the reference voltage, the motor control circuitry 34 of the controller 36 may increase the duty cycle at block 118 according to the difference between the applied voltage and the reference voltage, as determined at block 116 of FIG. 4. Of note, this determined difference may take into account any scaling or other processing used to step down a motor voltage, as discussed in connection with block 106. Moreover, one of skill in the art will appreciate that, where so configured, the difference may alternatively be used to step up motor voltage in another embodiment that is in accordance with the principles of the present invention.

If the applied voltage at block 120 is alternatively determined to be greater than the reference voltage, then the duty cycle of the power signal may be decreased at block 122. Such may be the case where a child or person of smaller stature is seated within the chair system 10. The duty cycle may be decreased at block 122 in proportion to the difference between the actual voltage and the reference voltage.

Where so configured at block 124, a load signal comprising an error signal may be initiated by motor control circuitry 34 in response to a discrepancy between the applied and reference voltages. The error signal generated at block 124 will automatically initiate modification of the duty cycle in proportion to the load at block 118 or block 122. Where the applied voltage is alternatively equal to or otherwise within acceptable tolerances of the reference voltage, the duty cycle of the power signal is maintained, as indicated at block 126 of FIG. 4.

In any case, the motor control circuitry 34 responds to a command to increase or decrease the duty cycle of the motor 24 by generating a pulse width modulated signal as shown at block 128. The resultant power signal is then communicated to the motor 24 at block 130. In this manner, the actuator 26 is continuously driven at block 132 at the desired speed.

The sequence of steps of the flowchart 100 of FIG. 4 may be accomplished automatically and in realtime. Thus, the power supplied to the motor 24 is continuously and automatically adjusted to maintain the desired speed. Moreover, this dynamic adjustment may be accomplished in a manner that is transparent to the patient and/or healthcare professional. That is, the load (including the motor voltage across the motor 24, where applicable) is constantly monitored in a feedback loop that continuously apportions power to the motor 24 to maintain the desired speed.

Figure 5:
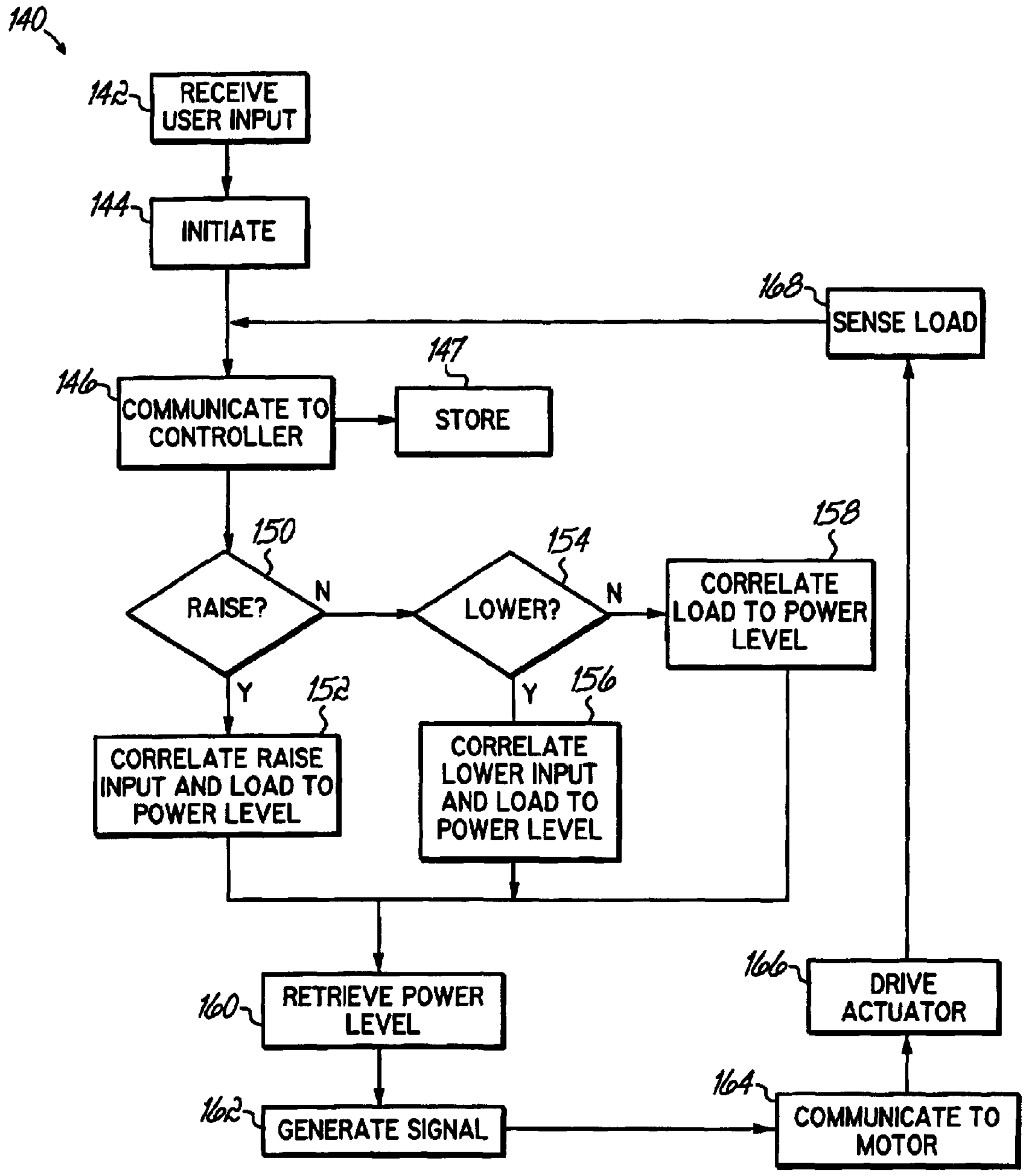
FIG. 5 is a flowchart having a sequence of steps suited for execution by the system of FIG. 1 for automatically positioning a chair at a desired speed using a lookup table.

FIG. 5 shows a sequence of process steps in accordance with the principles of the present invention. That is, the flowchart 140 of FIG. 5 includes method steps suited for automatically achieving a desired speed irrespective of load and directional requirements of a chair positioning operation. In one respect, the processes of FIG. 5 achieve the desired speed using a lookup table. That is, directional data and/or other load information are correlated to stored power levels.

Turning more particularly to the flowchart 140 of FIG. 5, a user may enter input at block 142. Exemplary user input may comprise directional data input via hand or foot input devices 38. For instance, input received at block 148 may indicate a user's desire to raise the chair 10. Other or the same such user input initiate program code 68 and memory processes of the chair system 10 at block 144 of FIG. 5. As shown at block 146 of FIG. 5, the user input is communicated to the controller 36. The controller 36 may store the input at block 147 within its memory 62 where advantageous.

In response to such input at block 150, the program code 68 of one embodiment that is consistent with the invention may correlate the directional data a load value determined at block 168. As discussed below in greater detail, the load value may include a patient weight, voltage or other measurement relating to work required by a motor 24 in moving a support surface 14. As more particularly shown in the embodiment of FIG. 5, the directional data comprising a raise or lower command is correlated to the determined load value to retrieve a power level field 92 of a database 64. Such a database 64 may include a plurality of stored power levels and load values. Each stored power level of the database 64 logically associates with the respective load value. The controller 36 then retrieves from the database 64 the power level correlated to the desired speed in response to receiving the load value.

Turning particularly to block 152 of FIG. 5, the power level field 92 and load value 88 may further be logically associated with a field 90 corresponding to the received raise command. Similarly, a input command processed by the controller 36 at block 154 to lower the chair 10 may cause the program code 68 to correlate a lower direction field and the load to a second power level at block 156.

Where no direction is indicated, or directional input is not considered when achieving a desired speed in accordance with the principles of the present invention, a software implementation consistent with the principles of the present invention may correlate the load directly to a power level. Such a scenario is shown at block 158 of FIG. 5.

In any case, the system retrieves the appropriate power level associated with the desired speed from memory 62 at block 160. The retrieved power level is used to generate the power signal at block 162, which is communicated to the motor 24. As discussed herein, the power level may comprise a recalled reference voltage. As such, the power signal of one embodiment that is consistent with the principles of the present invention may be generated according to the voltage comparison processes discussed above in connection with FIG. 4. In any case, the motor 24 drives the actuator 26 at block 166 as the chair system 10 dynamically monitors the load at block 168.

As discussed herein, all or a portion of the load forces acting upon the chair system 10 are determined at block 168. The load may be sensed or otherwise determined at block 168 by detecting the motor voltage and current loss, as discussed previously in connection with FIG. 4. Alternatively, the load may be determined at block 168 of FIG. 5 using a weight sensor or a voltage sensor positioned inline with the motor output. One skilled in the art will appreciate that any number of methods of determining load may alternatively be included within processes that are consistent with the principles of the present invention.

While the present invention has been illustrated by the description of embodiments thereof, and while the embodiments have been described in considerable detail, it is not intended to restrict or in any way limit the scope of the appended claims to such detail. Moreover, when the term "chair" is used above, it is intended to include the terms "table" and "bed." Additional advantages and modifications will be readily apparent to those skilled in the art.

For example, a load signal in another embodiment that is consistent with the principles of the present invention may comprise input from an error signal and/or position sensors 50. That is, the position sensors 50 may be used determine the speed at which the support surface 14 moves. As discussed herein, the detected speed is proportional to rpm's generated by the motor 24. These rpm's, in turn, are proportional to the voltage used to generate speed. In any case, the detected speed or determined voltage value may be fed back to the controller 36 via the load signal. The controller 36 may then compare the speed conveyed in the load signal to a reference value. The reference value may be associated with a desired speed. If the controller 36 determines that there is a disparity between the load signal and the reference, the controller 36 may increase or decrease the voltage delivered to the motor according to the determined disparity.

The invention in its broader aspects is therefore not limited to the specific details, representative apparatus and method, and illustrated examples shown and described. For instance, any of the exemplary steps of the above flowcharts may be augmented, replaced, omitted and/or rearranged while still being in accordance with the underlying principles of the present invention. Accordingly, departures may be made from such details without departing from the scope or spirit of Applicant's general inventive concept.

What is claimed is:

1. A method of positioning a patient support apparatus at a desired speed, comprising:

receiving a load signal indicative of a load on the patient support apparatus; and driving a motor configured to move the patient support apparatus using the load signal to achieve the positioning of the patient support apparatus at the desired speed in a manner that mitigates effects of the load.

2. The method of claim 1, wherein receiving the load signal further includes determining a voltage indicative of the load.

3. The method of claim 1, wherein receiving the load signal further includes determining at least one of: a first voltage delivered to the motor, a current draw of the motor, a second voltage associated with the current draw, a third voltage indicative of motor speed and a speed signal indicative of the motor speed.

4. The method of claim 1, wherein receiving the load signal further includes receiving a measurement determined by a weight sensor.

5. The method of claim 1, wherein driving the motor further includes comparing a determined voltage to a reference voltage.

6. The method of claim 1, wherein driving the motor further includes modifying a duty cycle of the motor according to the load signal.

7. The method of claim 1, wherein driving the motor further includes correlating the load signal to a power level associated with the desired speed.

8. The method of claim 1, wherein driving the motor further includes increasing a duty cycle if a determined voltage is different than a reference voltage.

9. The method of claim 1, wherein driving the motor further includes decreasing a duty cycle if a determined voltage is different than a reference voltage.

10. The method of claim 1, wherein driving the motor further includes generating the load signal.

11. The method of claim 1, wherein receiving the load signal further includes receiving at least one of: directional data indicative of a desired direction of movement of the support surface, a speed measurement, a voltage level and a patient weight.

12. The method of claim 1, wherein driving the motor further includes driving the motor at the desired speed for a first period corresponding to a first portion of a distance traveled by the support apparatus and at a second desired speed for a second period corresponding to a second portion of the distance traveled by the support apparatus.

13. A method of positioning a patient support apparatus at a desired speed, comprising:

determining a voltage associated with an electric motor configured to position a patient support apparatus using a load signal indicative of a load on the patient support apparatus, wherein the load includes a weight of a patient;

comparing the determined voltage to a reference voltage associated with a desired speed to obtain a comparison result;

using the comparison result to adjust a power level of a power signal supplied to the electric motor;

generating a power signal comprising the power level;

communicating the power signal to the electric motor; and positioning the patient support apparatus at the desired speed in a manner that mitigates effects of the load.

14. The method of claim 13, wherein receiving the load signal further includes receiving a signal indicative of whether the patient support apparatus is to be at least one of lowered and raised.

15. A method of positioning a patient support apparatus at a desired speed, comprising:

receiving a load signal indicative of a load on the patient support apparatus;

correlating the determined load to a power level of a plurality of stored power levels, each stored power level of the plurality of stored power levels being associated with a respective stored load value in a memory;

generating a power signal comprising the power level;

communicating the power signal to an electric motor configured to initiate moving the patient support apparatus; and moving the patient support apparatus at the desired speed in a manner that mitigates effects of the load.

16. The method of claim 15, wherein receiving the load signal further includes receiving a signal indicative of at least one of a patient's weight and whether the patient support apparatus is to be at least one of lowered and raised.

17. A patient support apparatus, comprising:

a moveable support surface;

an electric motor for driving the moveable support surface at a desired speed in response to a power signal comprising a power level;

a sensor having an output used to generate a load signal indicative of a load on the patient support apparatus; and a controller for processing the load signal and initiating generation of the power signal according to the load signal to achieve the desired speed in a manner that mitigates effects of the load.

18. The apparatus of claim 17, wherein the load signal includes a voltage indicative of the load.

19. The apparatus of claim 17, wherein the load signal includes at least one of: a first voltage delivered to the motor, a current draw of the motor, a second voltage associated with the current draw, a third voltage indicative of motor speed and a speed signal indicative of the motor speed.

20. The apparatus of claim 17, wherein the load signal includes a current draw of the motor.

21. The apparatus of claim 17, wherein the load signal includes directional data indicative of a desired direction of movement of the support surface.

22. The apparatus of claim 17, wherein the sensor includes at least one of: a resistor, a voltage detection circuit, a voltage sensor, a current sensor, a user input device, a weight sensor and a capacitor.

23. The apparatus of claim 17, wherein the controller is configured to compare a first voltage to a reference voltage.

24. The apparatus of claim 17, wherein the controller is configured to modify a duty cycle of the motor according to the load signal.

25. The apparatus of claim 17, wherein the controller is configured to correlate the load signal to a power level associated with the desired speed.

26. The apparatus of claim 17, wherein the controller is configured to increase a duty cycle if a determined voltage is different than a reference voltage.

27. The apparatus of claim 17, wherein the controller is configured to decrease a duty cycle if a determined voltage is different than a reference voltage.

28. The apparatus of claim 17, wherein the controller is configured to determine the power level.

29. The apparatus of claim 17, further comprising a pulse width modulator for generating the control signal.

30. The apparatus of claim 17, further comprising an actuator for mechanically cooperating with the motor to move the moveable support surface.

31. The apparatus of claim 17, wherein the desired speed changes according to the relative position of the moveable support surface.

32. A patient support apparatus, comprising:

a moveable support surface;

an electric motor for driving the moveable support surface at a desired speed in response to a signal comprising a power level, wherein the moveable support surface is moveable in a plurality of directions;

a memory including a plurality of stored power levels and directional data comprising the plurality of directions in which the moveable support surface is moveable, wherein each stored power level is logically associated with respective directional data; and a controller for retrieving from the memory the power level in response to receiving input indicative of the logically associated directional data and for initiating generation of the signal to achieve the desired speed in a manner that mitigates effects of gravitational forces associated with the directional data.

33. A patient support apparatus, comprising:

a moveable support surface;

an electric motor for driving the moveable support surface at a desired speed in response to a signal comprising a power level;

a memory including a plurality of stored power levels and load values, wherein each stored power level is logically associated with a respective load value; and a controller for retrieving from the memory the power level in response to receiving the logically associated load value and for initiating generation of the signal to achieve the desired speed in a manner that mitigates effects of a load on the movable support surface, wherein the load is associated with the respective load value.

* * * * *

US006907630C1

(12) EX PARTE REEXAMINATION CERTIFICATE (7486th)

United States Patent

Treon

(10) Number: US 6,907,630 C1

(45) Certificate Issued: May 4, 2010

(54) LOAD COMPENSATION SYSTEM FOR POWER CHAIR

(75) Inventor: Thomas L. Treon, Versailles, OH (US)

(73) Assignee: Midmark Corporation, Versailles, OH (US)

Reexamination Request:
No. 90/010,387, Jan. 27, 2009

Reexamination Certificate for:

| | |
|---|---|
| Patent No.: | **6,907,630** |
| Issued: | **Jun. 21, 2005** |
| Appl. No.: | **10/684,050** |
| Filed: | **Oct. 10, 2003** |

(51) Int. Cl.

| | |
|---|---|
| ***G05B 11/01*** | (2006.01) |
| ***G05B 13/02*** | (2006.01) |
| ***A47C 1/14*** | (2006.01) |
| ***A61G 15/02*** | (2006.01) |

(52) U.S. Cl. ............................ 5/611; 318/433; 318/265; 318/286; 601/24

(58) Field of Classification Search ........................ None

See application file for complete search history.

(56) References Cited

U.S. PATENT DOCUMENTS

| | | | |
|---|---|---|---|
| 4,355,274 | A | 10/1982 | Bourbeau |
| 4,394,606 | A | 7/1983 | Woerwag |
| 4,628,910 | A | 12/1986 | Krukowski |
| 4,754,850 | A | 7/1988 | Caputo |
| 4,956,592 | A | 9/1990 | Schulte et al. |
| 5,650,709 | A | 7/1997 | Rotunda et al. |
| 5,884,350 | A | 3/1999 | Kurze |

OTHER PUBLICATIONS

Barr, Michael, "Introduction to Pulse Width Modulation (PWM)," http://www.netrino.com/Embedded–Systems/How–To/PWM–Pulse–Width–Modulation. <last visited Jun. 30, 2009>, also published in Embedded Systems Programming, Sep. 2001 pp. 103–104.*

* cited by examiner

*Primary Examiner*—Jeanne M. Clark

(57) ABSTRACT

An apparatus and method positions a powered examination chair at a constant, desired speed. The desired speed is achieved irrespective of patient weight and/or direction of chair travel. A power signal supplied to an actuating motor is apportioned according to a load incident on the chair. The determined load accounts for patient weight, as well as to gravitational and mechanical forces.

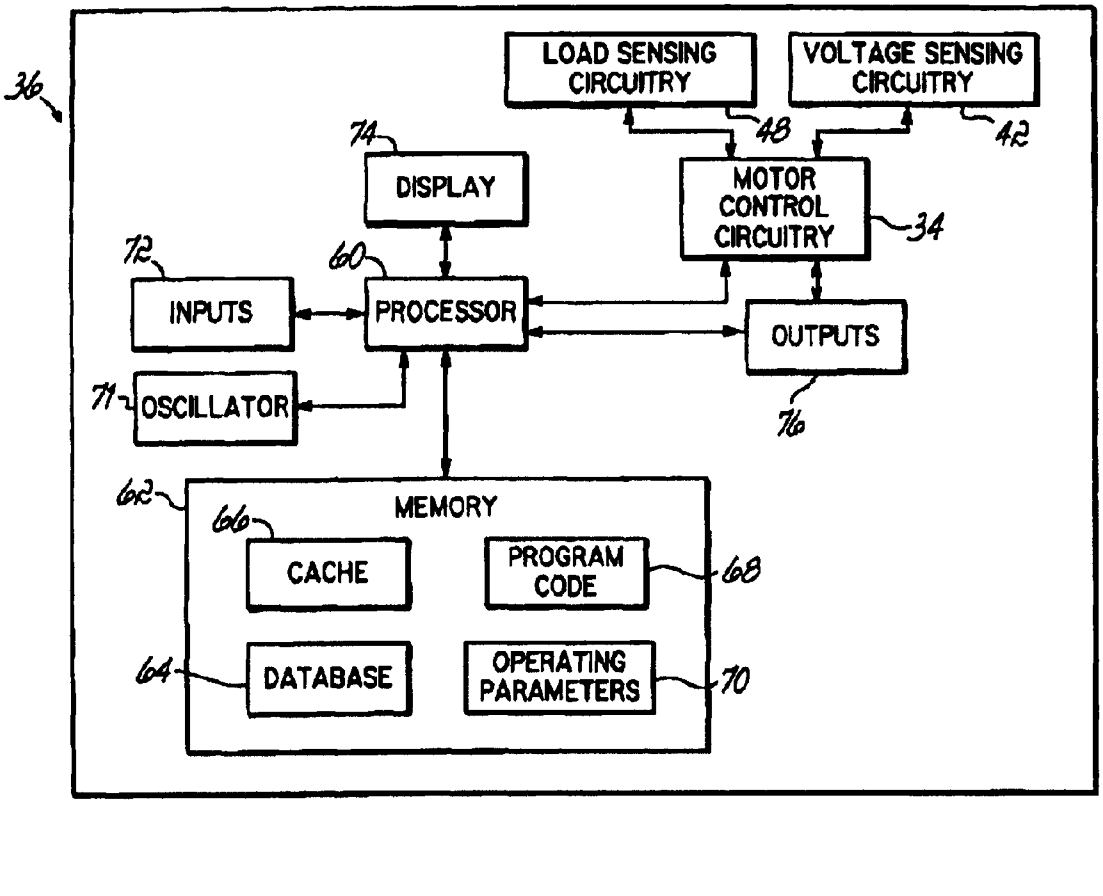

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–33 are cancelled.

* * * * *